United States Patent
Tan

(10) Patent No.: US 9,247,083 B2
(45) Date of Patent: Jan. 26, 2016

(54) MEMORY CARD AND METHOD FOR STORAGE AND WIRELESS TRANSCEIVING OF DATA

(75) Inventor: Joon Yong Wayne Tan, Singapore (SG)

(73) Assignee: T-Data Systems (S) PTE LTD, Singapore (SG)

( * ) Notice: Subject to any disclaimer, the term of this patent is extended or adjusted under 35 U.S.C. 154(b) by 0 days.

(21) Appl. No.: 13/513,108

(22) PCT Filed: May 14, 2010

(86) PCT No.: PCT/SG2010/000183
§ 371 (c)(1),
(2), (4) Date: May 31, 2012

(87) PCT Pub. No.: WO2011/068471
PCT Pub. Date: Jun. 9, 2011

(65) Prior Publication Data
US 2012/0242845 A1    Sep. 27, 2012

(30) Foreign Application Priority Data

Dec. 1, 2009 (SG) ............... PCT/SG2009/000461
Mar. 1, 2010 (SG) ............... PCT/SG2010/000070

(51) Int. Cl.
*H04N 5/225* (2006.01)
*H04N 5/232* (2006.01)
(Continued)

(52) U.S. Cl.
CPC ....... *H04N 1/00474* (2013.01); *H04N 1/00413* (2013.01); *H04N 1/00488* (2013.01); *H04N 1/00503* (2013.01); *H04N 1/00965* (2013.01);
(Continued)

(58) Field of Classification Search
CPC .............. H04N 5/225; H04N 5/23203; H04N 5/23206; H04N 5/23241
USPC ......................................... 348/208.15, 222.1
See application file for complete search history.

(56) References Cited

U.S. PATENT DOCUMENTS 7,440,774 B2     10/2008  Croome
2002/0052219 A1*  5/2002  Hamamura ................... 455/557
(Continued)

FOREIGN PATENT DOCUMENTS

JP    H06127250 A   5/1994
JP    3155377 B2    4/2001
(Continued)

OTHER PUBLICATIONS

Canon Inc. Summary of DPOF Version 1.10 (online) Jul. 17, 2000, (retrieved on Jun. 28, 2010) retrieved from the internet. <URL: http://web.archive.org/web/20080319045046/http://panasonic.jp/dc/dpof_110/white_e.htm>.
(Continued)

*Primary Examiner* — Nicholas Giles
*Assistant Examiner* — Abdelaaziz Tissire
(74) *Attorney, Agent, or Firm* — Lerner, David, Littenberg, Krumholz & Mentlik, LLP

(57) ABSTRACT

A memory card is described, the memory card having a wireless transceiver module, a central processor, and a storage module. The memory card when physically and operably engaged in and with a digital camera, is configured to wirelessly transmit digital data to an external device through the wireless transceiver module substantially in real time, and wirelessly receive digital data from the external device through the wireless transceiver module substantially in real time.

23 Claims, 11 Drawing Sheets

(51) Int. Cl.
*H04N 1/00* (2006.01)
*H04N 1/21* (2006.01)
*H04M 1/725* (2006.01)

(52) U.S. Cl.
CPC ........... *H04N 1/2112* (2013.01); *H04N 1/2158* (2013.01); *H04N 5/225* (2013.01); *H04N 5/23203* (2013.01); *H04N 5/23206* (2013.01); *H04N 5/23241* (2013.01); *H04M 1/72527* (2013.01)

(56) References Cited

U.S. PATENT DOCUMENTS

| | | | |
|---|---|---|---|
| 2002/0174337 A1* | 11/2002 | Aihara | 713/172 |
| 2003/0079096 A1* | 4/2003 | Murakami | 711/156 |
| 2003/0128272 A1* | 7/2003 | Clough et al. | 348/14.02 |
| 2003/0146977 A1* | 8/2003 | Vale et al. | 348/207.1 |
| 2003/0179301 A1* | 9/2003 | Feldis et al. | 348/231.3 |
| 2004/0127254 A1* | 7/2004 | Chang | 455/557 |
| 2004/0197078 A1* | 10/2004 | Yoon et al. | 386/46 |
| 2004/0219949 A1* | 11/2004 | Su et al. | 455/558 |
| 2005/0156737 A1* | 7/2005 | Al-Khateeb | 340/541 |
| 2006/0000914 A1 | 1/2006 | Chen | |
| 2006/0039221 A1* | 2/2006 | Fukuda | 365/222 |
| 2006/0056326 A1* | 3/2006 | Croome | 370/315 |
| 2006/0116161 A1* | 6/2006 | Lee et al. | 455/556.1 |
| 2006/0125867 A1* | 6/2006 | Sakuda et al. | 347/19 |
| 2006/0246840 A1* | 11/2006 | Borowski et al. | 455/41.2 |
| 2006/0277216 A1 | 12/2006 | Shukhman | |
| 2007/0015589 A1* | 1/2007 | Shimizu et al. | 463/43 |
| 2007/0030357 A1* | 2/2007 | Levien et al. | 348/211.14 |
| 2007/0073937 A1* | 3/2007 | Feinberg et al. | 710/62 |
| 2008/0012951 A1* | 1/2008 | Paek | 348/211.2 |
| 2008/0195797 A1* | 8/2008 | Sherman et al. | 711/103 |
| 2008/0316331 A1* | 12/2008 | Jun | 348/222.1 |
| 2009/0128634 A1* | 5/2009 | Miura et al. | 348/207.1 |
| 2009/0140043 A1 | 6/2009 | Graves et al. | |
| 2010/0115200 A1* | 5/2010 | Papagrigoriou | 711/115 |
| 2010/0201845 A1* | 8/2010 | Feinberg et al. | 348/231.99 |
| 2011/0004840 A1* | 1/2011 | Feinberg et al. | 715/772 |
| 2011/0025858 A1* | 2/2011 | Elazar et al. | 348/207.1 |
| 2011/0058510 A1* | 3/2011 | Thomas et al. | 370/311 |
| 2011/0085015 A1* | 4/2011 | Jun et al. | 348/14.01 |
| 2011/0115935 A1* | 5/2011 | Myung | 348/222.1 |
| 2011/0145464 A1* | 6/2011 | Tan | 710/301 |
| 2011/0261217 A1* | 10/2011 | Muukki et al. | 348/222.1 |
| 2012/0242845 A1* | 9/2012 | Tan | 348/207.1 |

FOREIGN PATENT DOCUMENTS

| | | |
|---|---|---|
| JP | 2002009690 A | 1/2002 |
| JP | 2003324379 A | 11/2003 |
| JP | 2004064285 A | 2/2004 |
| JP | 2005252552 A | 9/2005 |
| JP | 2005323220 A | 11/2005 |
| JP | 2006031512 A | 2/2006 |
| JP | 2006287734 A | 10/2006 |
| JP | 2007251749 A | 9/2007 |
| JP | 2007318436 A | 12/2007 |
| JP | 2008205716 A | 9/2008 |
| JP | 2009060590 A | 3/2009 |
| JP | 2009118367 A | 5/2009 |
| JP | 2009177413 A | 8/2009 |
| TW | 200828124 A | 7/2008 |
| TW | M350790 U | 2/2009 |
| WO | 2007035275 A2 | 3/2007 |

OTHER PUBLICATIONS

International Search Report and Written Opinion for PCT/SG2010/000183 dated Jul. 13, 2010.

* cited by examiner

- [HDR]
- GEN REV = 01.10
- GEN CRT = "S10000pj"
- GEN DTM = 2010: 03:23:14:16:17
- [JOB]
- PRT PID=001
- PRT TYP=STD  ⟵ 1014
- PRT QTY=001
- IMG EMT=EXIF2-J
- <IMG SRC="../DCIM/124NIKON/DSCN9127.JPG">  ⟵ 1016
- CFG DSC=" 23.03.2010" –ATR DTM
- CFG DSC=" 1/17 F3.9" –ATR CTM
- [JOB]
- PRT PID=002
- PRT TYP=STD
- PRT QTY=001
- IMG EMT=EXIF2-J
- <IMG SRC="../DCIM/124NIKON/DSCN9128.JPG">  ⟵ 1018
- CFG DSC=" 23.03.2010" –ATR DTM
- CFG DSC=" 1/17 F3.9" –ATR CTM

MEMORY CARD AND METHOD FOR STORAGE AND WIRELESS TRANSCEIVING OF DATA

REFERENCE TO RELATED APPLICATIONS

The present application is a national phase entry under 35 U.S.C. §371 of International Application No. PCT/SG2010/000183 filed May 14, 2010, published in English, which claims priority from International Application No. PCT/SG2010/000070 filed Mar. 1, 2010, which claims priority from International Application No. PCT/SG2009/000461 filed Dec. 1, 2009, all of which are incorporated herein by reference. The disclosures of International Application No. PCT/SG2008/000327 filed Sep. 4, 2008 and International Application No. PCT/SG2009/000279 filed Aug. 12, 2009 are hereby incorporated by reference herein.

TECHNICAL FIELD

This invention relates to a memory card and method for storage and wireless transceiving of data and refers particularly, though not exclusively, to such a memory card and method using a wireless media for enabling a digital camera to communicate wirelessly.

DEFINITIONS

Throughout this specification a reference to a digital camera is to be taken as including a reference to a digital camera, digital video camera, digital voice recorder, or digital diary.

Throughout this specification a reference to another digital device is to be taken as being a reference to a wireless-enabled personal computer, laptop computer, notebook computer, tablet computer, personal digital assistant, server, mobile telephone, or a cellular telephone; or a digital photo frame.

BACKGROUND

Digital cameras must be physically and electrically connected to a host computer to enable downloads and uploads of digital content. The digital content may be, for example, images, video images, marketing material, music content, and so forth. The application to manage and control uploads and downloads resides in the host computer. This is not always convenient.

This is because the digital camera has a processor that is incapable of independently exporting digital data captured by the digital camera. The digital camera requires a connection with the host computer to and the host computer imports the digital data captured by the digital camera, and the host computer exports digital data from the host computer to the digital camera. For all relevant functions the host computer controls the process. Alternatively, a memory card or similar non-volatile memory of the digital camera may be removed and inserted into the host computer for the digital data stored in the memory card to be uploaded to the host computer. Once stored in the host computer's memory, the digital data can be uploaded to a web site. For example, there are many web sites allowing the storing of personal photographs—"FaceBook" and "U-Tube" being but two of many examples. This requires access to a host computer for uploading to take place. This may not always be convenient. Also, there is a significant loss of data integrity at such sites.

A similar problem happens when attempting to share data between a number of digital cameras or other digital devices. For high-end mobile or cellular telephones, an MMS or email can be used to send a photograph or other data, but this is expensive and slow. It is also limited in data capacity. Otherwise a storage card or other storage apparatus can be used to transfer the data. This again is quite slow, and requires the digital cameras or other digital devices to have compatibility regarding the storage used.

SUMMARY

According to an inventive aspect there is provided a memory card configured to be used in a digital camera having an inbuilt processor incapable of independently exporting digital data externally of the digital camera or independently importing digital data from externally of the digital camera, the memory card comprising:
  a wireless transceiver module being operably connected to at least one of:
    a central processor, and
    a storage module; and being configured to wirelessly receive the digital data transmitted to the digital camera and to wirelessly transmit the digital data from the digital camera;
  the central processor being configured to control at least one of:
    the reception of the digital data by the digital camera, and
    the transmission of the digital data from the digital camera;
  the storage module being operably connected to the central processor and being configured to store at least one of the digital data captured by the digital camera, and the digital data received by the digital camera; and
  the memory card is configured to at least one of:
    wirelessly transmit the digital data to at least one external device through the wireless transceiver module, and
    wirelessly receive the digital data from an external device through the wireless transceiver module;
    and wherein the storage of the digital data is able to take place substantially in real time, and the transmission of the digital data is able to take place substantially in real time.

According to another inventive aspect there is provided a method for at least one of: exporting digital data from or receiving digital data by a digital camera having an inbuilt processor incapable of independently exporting digital data externally of the digital camera or importing digital data from externally of the digital camera, the method comprising:
  using a memory card installed in and operatively connected to the digital camera, the memory card having a central processor, a storage module and a wireless transceiver module;
  using controls of the digital camera to control the operation of the memory card;
  the central processor and the storage module being used to store the digital data;
  the wireless transceiver module is used for at least one of:
    wirelessly receiving the digital data, and
    wirelessly transmitting the digital data;
  and wherein the storage of the digital data is able to take place substantially in real time, and the transmission of the digital data is able to take place substantially in real time.

According to a further exemplary aspect, there is provided a digital camera having:

an inbuilt processor incapable of independently exporting digital data externally of the digital camera or importing digital data from externally of the digital camera; and the memory card described above.

For these aspects the wireless transmission of the digital data to at least one external device through the wireless transceiver module as well as the wireless receiving of the digital data from an external device apparatus through the wireless transceiver module may both be configured to be in response to an instruction received by the central processor from the inbuilt processor of the digital camera. The memory card may further comprise a buffer for buffering the digital data when being stored or transmitted. The memory card may be configured to detect potential wireless networks to which the memory card can be connected. The wireless transmission and reception may be by Wi-Fi. The memory card may be configured to physically and operatively engage in and with the digital camera, and to operatively connect with the inbuilt processor; the operative connection being in the same manner as, and the inbuilt processor sees the memory card as, a normal memory card. The digital data may be selected from: image data, audio data, image and audio data, video data, and audio and video data.

The wireless transceiver module may be configured to transmit the data to a plurality of wireless-enabled external devices arranged in one of: parallel, and series. At least one of the external devices is a digital camera or another digital device. The wireless transceiver module may be configured to effect the transmission substantially in real time so the data may be transmitted substantially when obtained either from the storage module or from the digital camera.

When the digital camera is being used to capture the data, the data may be able to be stored in the storage module substantially in real time. The storage may be substantially at the same time as the data is being transmitted. The buffer may be configured to buffer one of the transmission and the storage.

The digital data may be exported to or imported from another digital camera or another digital device having a memory card as described above. The wireless communication between the wireless transceiver module and the plurality of external devices may be based on peer-to-peer protocols and an authentication between wireless transceiver module and the plurality of external devices may take place. Authentication may be by use of a common IP address.

Some optional features are defined in the dependent claims.

For example, the memory card may comprise a buzzer configured to notify a user of the status of the digital data transfer from or to the digital camera. From the buzzer sounds, the user may advantageously ascertain if the digital data has been successfully transferred from or to the digital camera.

Also, the central processor of the memory card may also be configured to prevent the inbuilt processor of the digital camera from going into a "sleep" mode. Advantageously, this may prevent the digital camera from going into the "sleep" mode when the digital data is being transferred from or to the digital camera.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings.

In the drawings:

FIG. 9, comprising

FIG. 10a shows a directory structure of the wireless media of FIG. 3;

FIG. 10b shows an example of an autoprint AUTPRINT.MRK file stored in a root directory of the directory structure of FIG. 10a;

DETAILED DESCRIPTION OF EXEMPLARY EMBODIMENTS

The exemplary embodiment is a memory card and method for use with a digital camera for storage and wireless transceiving of data, the memory card having a wireless media for enabling the digital camera to communicate wirelessly.

As shown in FIGS. 1 to 5, there is a digital camera 100 having a slot 102 into which a memory card 200 is able to be inserted and removed in the usual manner.

Figure 1:
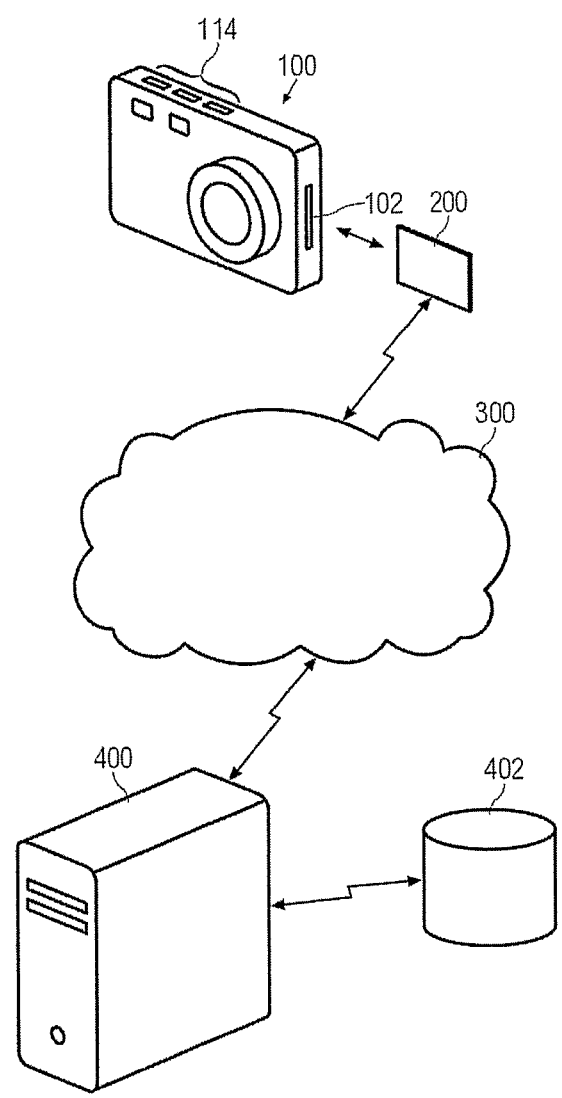
FIG. 1 is a schematic view of an exemplary system of a wireless media connectable to a host device to enable data captured from the host device to be transferred to a server wirelessly.
Figure 2:
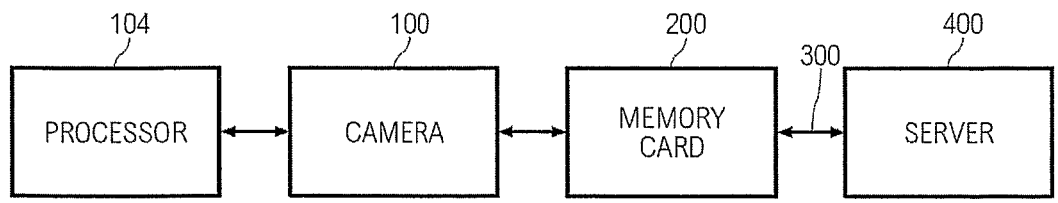
FIG. 2 is a block diagram illustrating the exemplary system of FIG. 1.
Figure 3:
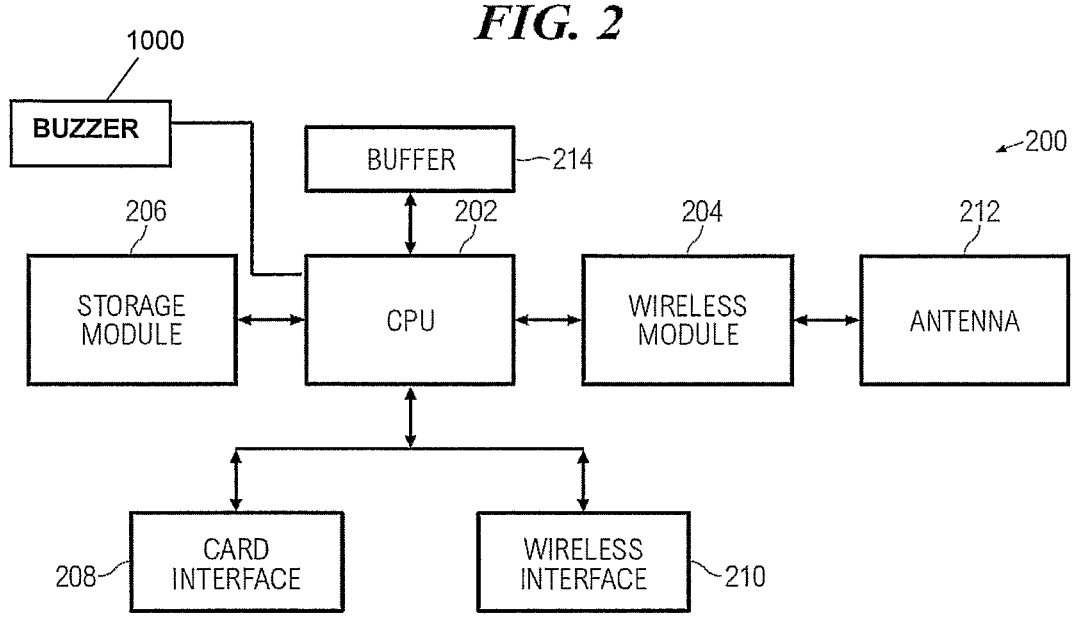
FIG. 3 is an illustration of the wireless media of FIG. 1.
Figure 4:
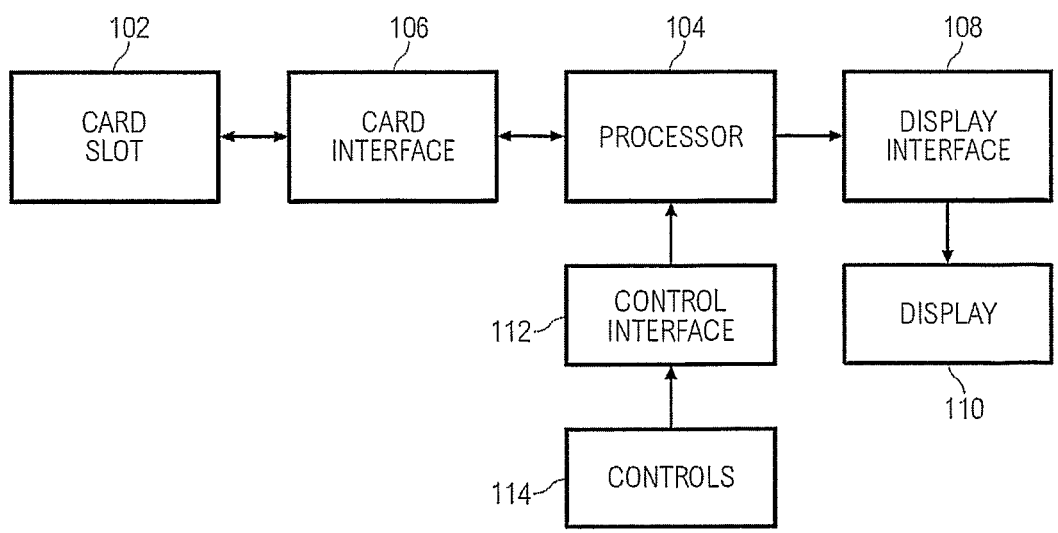
FIG. 4 is an illustration of the processor of the host device of FIG. 1.

The memory card 200 is shown in FIG. 3 and has a central processor 202, a wireless transceiver module 204 operatively connected to the central processor 202, and a storage module 206 operatively connected to the central processor 202. The central processor 202 has a card interface 208 as well as a wireless interface 210. The wireless transceiver module 204 also has an antenna 212. The CPU 202 has a buffer 214 to enable the buffering of data particularly when the wireless transceiver module 204 is sending or receiving data.

The digital camera 100 has an inbuilt processor 104 with a card interface 106 for interfacing with the memory card 200 when inserted into slot 102. The inbuilt processor 104 also has a display interface 108 for controlling the display screen 110 of the camera 100. Furthermore, the inbuilt processor 104 has a control interface 112 for enabling the camera controls and so forth 114 to be used to control the operation of the camera 100. The inbuilt processor 104 is incapable of independently exporting digital data externally of the camera 100. By independently exporting it is meant that the processor 104 requires the camera 100 to be operatively connected to an intelligent host such as a computer that has the relevant operative software to enable the export of the data to the computer from the camera, the exporting being under the control of the computer. The normal operation of the camera 100 is under the control of the inbuilt processor 104.

The inbuilt processor 104 is also incapable of independently importing digital data from externally of the camera 100. By independently importing it is meant that the processor 104 requires the camera 100 to be operatively connected to an intelligent host such as a computer that has the relevant operative software to enable the export of the data to the camera from the computer (i.e. import of the data by the camera from the computer), the exporting/importing being under the control of the computer.

Due to the card interface 208, whenever memory card 200 is engaged in the slot 102 of the camera 100 (500), the card interface 106 sees the memory card 200 as a normal memory card and will interface with it in the usual manner for transferring image and/or audio data from the inbuilt processor 104 to the memory card 200 (501). If the card 200 is not of a category recognised by the camera 100, it will display an error message in the normal manner and the process ends (502).

Once the initial connection between the inbuilt processor 104 and the card 200 is concluded, and upon the camera control being set to a predetermined mode such as, for example, "view" (or its equivalent such as, for example, "play" or "display" or "transfer data") (503), the inbuilt processor 104 downloads from card 200 the first image file for display on the display 110 in accordance with normal operations. The central processor 202 then sends to the display interface 108 an index image file containing a first menu (504), with the navigation controls of controls 114 being able to be used in the normal manner for controlling the displayed menu. The first menu will contain a series of first items for determining the future performance of the camera 100. Each of the items of the first menu is a separate image within the index image file. The first menu items may include, for example:
  1. transfer data
  2. wireless detect
  3. view image.

If at (503) the camera 100 is not set to the predetermined mode—"view" or its equivalent—the memory card 200 and the inbuilt processor 104 operate in the normal, known manner (505) under the operation of the inbuilt processor 104.

If the camera 100 is set to the predetermined mode, one of the displayed items must then be selected (506). As each item in the menu is a separate image, selecting one item in the menu list is selecting a separate image. Therefore, the controls 114 used must be such that the processor 104 can send an instruction to the central processor 202. There are normally two such instructions when in the view mode—"next" (send next image) and "delete" (delete this image). As "next" is required for the following operations, the "delete" function can be used. However, when the camera 100 is in the "view" mode AND if either "transfer data" or "wireless detect" is selected from the first menu items given above, the central processor 202 will interpret "delete" as "select". When the "send first image", instruction is sent by the processor 104 and is received by memory card central processor 202 (504), the central processor 202 recognizes that the camera 100 is in the "view" mode as this is the only time such an instruction is received.

As each of the first menu items is a separate image, by using "delete" not only is an instruction sent from processor 104 to central processor 202, but the instruction contains an identifier of the image to enable the central processor 202 to know which image is to be accordingly processed.

The central process 202 receives the instruction and, after confirming that the predetermined mode has been selected AND that the image selected is either (1) or (2) from the image index file, the central processor 202 treats the "delete" instruction as "select".

The central processor 202 will then take the necessary action depending on whether first menu item 1 or first menu item 2 was selected.

A query is raised (509) to determine if the first menu item selected is for wireless transfer. If not, it must be item 3. If item 3 is selected in the normal manner using controls 114 (507), the central processor 202 will treat the instruction in the normal manner and send the first image file from the storage module 206 (508) and the camera 100 and memory card 200 will continue to operate in the normal manner (505). If at (509) the first menu item selected is for wireless transfer, it could be item 1 or item 2. So a second query is raised (510) to determine if item 1 or item 2 was selected.

If at 510 item 2 was selected, the central processor 202 will activate the wireless transceiver module 204 (511) and a search will be undertaken for potential wireless networks to which the card 200 can be connected (512). This will be in the normal manner. Once all potential wireless networks are detected (513) they are displayed on the display 110 (514) and the controls 114 are used to select the desired wireless network (515). Upon the desired wireless network being selected a second index image file is downloaded from the central processor 202 to the display 110 (516). The second index image file contains a second menu list (517). The second index image file may be the same as the first index image file, or may be different. Each of the second menu list is also a separate image and has its own identifier. The second menu list may be the same as the first menu list, or may be different. The second menu list may include items such as, for example:
  1. transfer data
  2. wireless detect
  3. view image If at (510) item 1 is selected from the first menu list, the central processor 202 will determine if a wireless network has previously been selected (521). If not, it will revert to item 2 (510) and commence the search for potential wireless networks, as is described above. If a wireless network has previously been selected, the central processor 202 sequentially obtains the image data for the various image files (522) and, using the wireless transceiver module 204, uploads the image data to the selected, pre-determined web site (523). Upon uploading completing, a "completion" message may be displayed on display 110 (524) then the process ends (525).

If item 1 is selected from the second menu list at (518) and as the pre-determined web site is known and the network has just been selected, the central processor 202 will commence to download all the image files from the storage module 206 and transfer them to the wireless transceiver module 204 for wireless uploading of the image data to a pre-determined web site. If there is more than one pre-determined web site, the central processor 202 will send a list of the pre-determined web sites for display on the display 110 and, after one has been selected in the normal manner, will use the selected, pre-determined web site as that to which the image data is to be sent. The list of pre-determined web sites may be by their URL, or by a previously-entered abbreviated name and may include an email account at a web site.

The entry of the pre-determined web site is by previously operatively connecting the memory card 200 to a computer (not shown). The computer will upload the necessary interface from the central processor 202 and the computer will be used to enter the URL of the desired web site or web sites, or the email account, which is then stored in the storage module 206 of the memory card 200.

As such, when the camera 100 has been used to capture images that are stored in the storage module 206 of the memory card 200 in the normal manner, upon the camera controls 114 being set to the predetermined mode such as view, the procedure described above will commence. When in the camera 100 is in the predetermined mode, the central processor 202 and the wireless transceiver module 204 will then operate to send the image data to the selected, pre-determined web site over the Internet 300 so the images can be stored in the storage 402 of the server/PC or other computer 400. This may be done at a convenient time such as, for example, overnight when the camera 100 would normally not be in use. In addition, when the camera 100 is in the predetermined mode it may be used to download the image data from the selected, predetermined web site over the Internet 300 to enable the images to be stored in the storage module 206. This may be required if the images had previously been deleted from the storage module 206.

If desired or required, when the uploading of all the image data is completed, the central processor 202 may compress or downsize the image data as stored in the storage module 206. Compression may be by any known and/or suitable compression application.

Downsizing may be to downsize the images to, for example, thumbnail size. Compression and/or reduction are used to reduce the amount of memory in storage module 206 that is required to store the image data. Any compressed and/or reduced images will be noted and not resent to the pre-selected web site. Furthermore, any images that are sent to the pre-selected web site may be flagged as having been sent, and may not be resent in the future. However, the central processor 202 may send a prompt to the display 110 asking if old images are to be sent again, or only new, and previously unsent, images. Appropriate action will be taken by central processor 202 after the selection is made in the manner described above.

Figure 6:
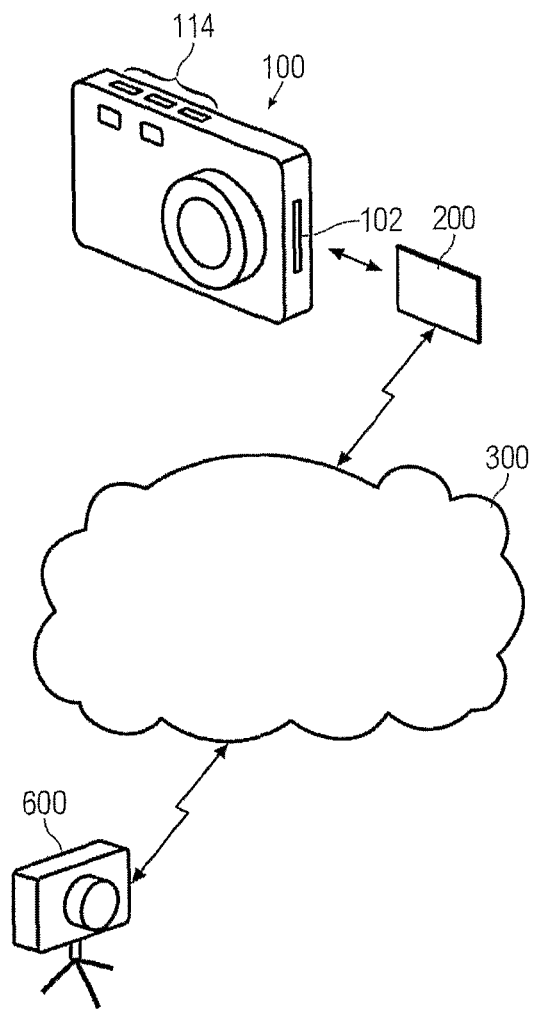
FIG. 6 is a schematic view of an exemplary system of a wireless media wirelessly connectable to an external device to enable data to be wirelessly received by the wireless device from, or sent by the wireless media to, the external source.

In FIG. 6 there is shown a second exemplary embodiment where the wireless transceiver module 204 is used to wirelessly receive digital data from an external digital camera or another digital device 600, or to wirelessly send digital data to the external digital camera or another digital device 600. In this exemplary embodiment the wireless transceiver module 204 is to receive digital data from the external source being a remote camera 600, such as, for example, a digital camera or another digital device such as, for example, a security camera that is used for capturing images or video. However, it may be, for example, a camera similar to the digital camera 100 so that sharing of images or video may take place on a camera-to-camera basis. The remote camera 600 may have image, video and/or audio capturing capability. It should have a wireless module capable of wireless communication by at least one relevant and appropriate standard such as, for example, Wi-Fi or Bluetooth. This may be by use of a memory card 200 with a wireless transceiver module 204. The remote camera 600 has wireless capability for transmitting image or video data (including audio) over the network 300 to the wireless module 204, or directly to the wireless module 204. This may be by use of Wi-Fi, the Internet, Bluetooth, or otherwise as required. However, Wi-Fi may be preferred due to the functionality allowed by its protocol.

Figure 5A:
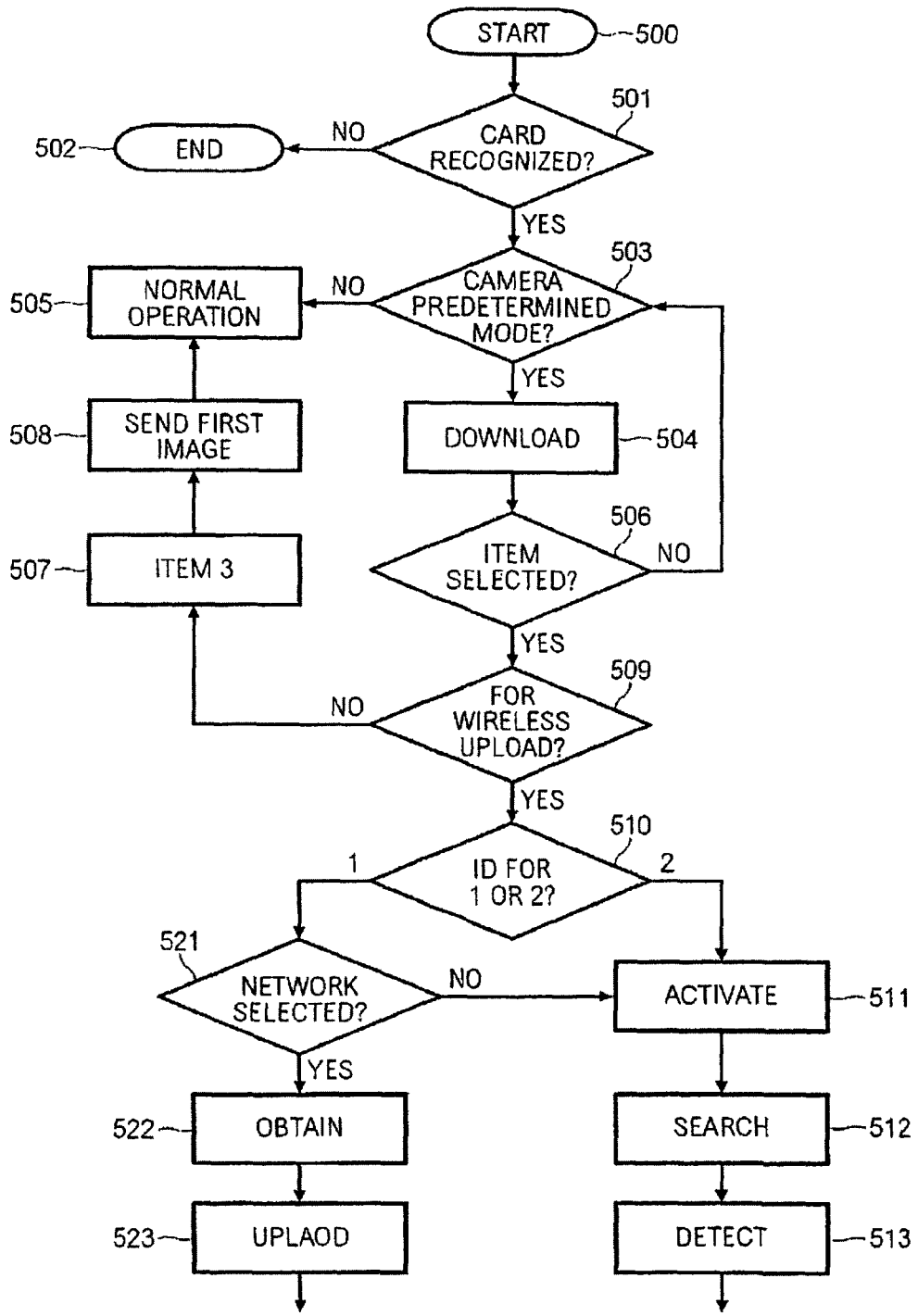
FIG. 5 is a flow chart for the operation of the exemplary embodiment of FIGS. 1 to 4 and 6.
Figure 5B:
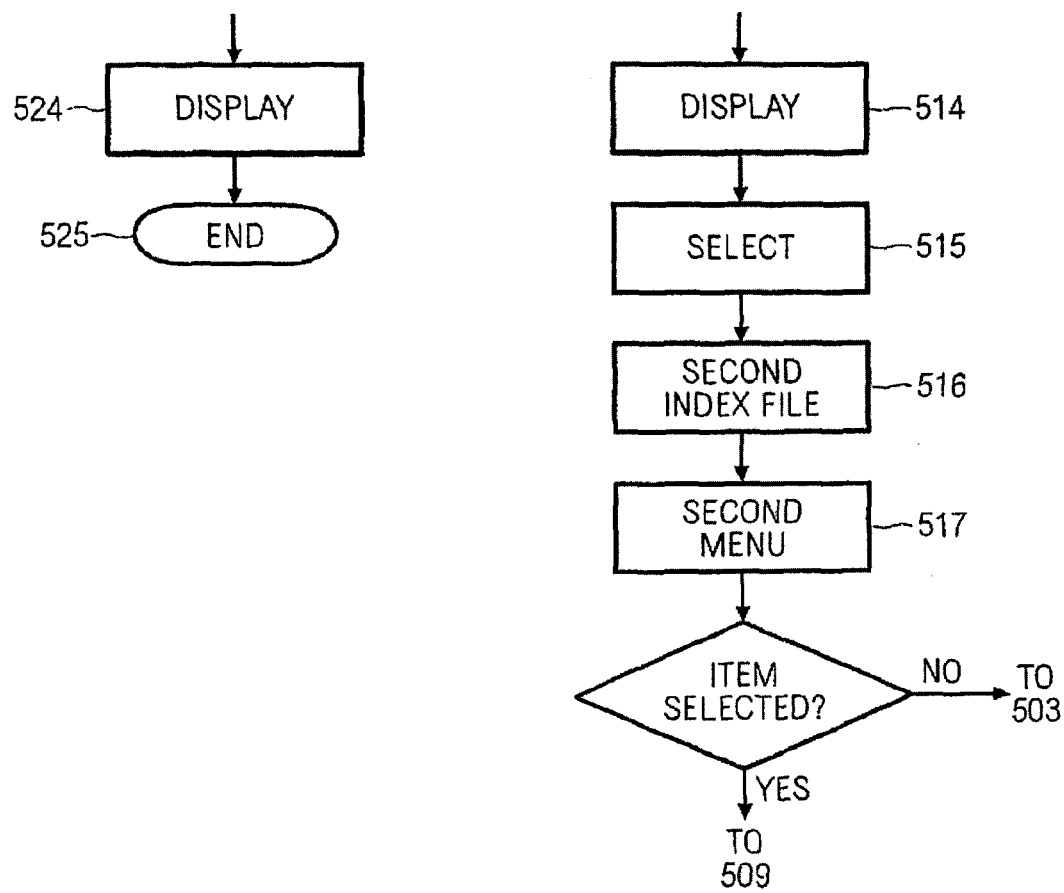

With reference to FIG. 5, if the digital camera 100 is in the predetermined mode at 503 there may be a further query by a further menu item to determine if the memory card 200 is to be used to upload digital data captured by the digital camera 100, or is to be used to receive digital data from the remote camera 600. If it is upload, the digital camera 100 operates as described above. If it is to receive, the digital camera 100 is used to receive and display the digital data sent by the remote camera 600. The digital data received by the digital camera 100 from the remote camera 600 may also be stored in the storage module 206. The storing may be in real time so the data can be displayed and/or recorded.

In this way the digital data captured by the remote camera 600 can be displayed and/or stored by the digital camera 100. In that way if the remote camera 600 is a digital camera and it detects an intrusion, it can be viewed on the digital camera 100 as long as the digital camera 100 is able to wirelessly receive the digital data. Appropriate action can then be taken. The digital camera 600 may be of any suitable nature or form with the only requirement being a capability of wireless transmission. The wireless transmission module may be integral with the digital camera 600 or may be a separate component, the digital camera 600 and the separate component being operatively connected. If the remote camera 600 is a camera similar to the digital camera 100 with a memory card 200, file sharing can take place on a camera-to-camera basis without the need for email, websites or other removable storage devices. The remote digital camera 600 may store the digital data in its own memory card 200 at as close to the same time as the wireless protocol will allow. For example, with Wi-Fi there may be a delay of a few seconds due to the buffering required.

As can be seen, for both exemplary embodiments the memory card 200 will be able to connect to the host device 100 without any driver installation or modification of the software running on the host device 100 and is thus "plug-and-play".

The memory card 200 may include a digital rights management module for copyright protection of content downloaded to the memory card 200 storage module 206.

Furthermore, when in the predetermined mode the central processor 202 may over-ride any auto-off or auto-shut-down of the camera 100 to enable the camera 100 to continue to operate until it is taken out of the predetermined mode.

Figure 7:
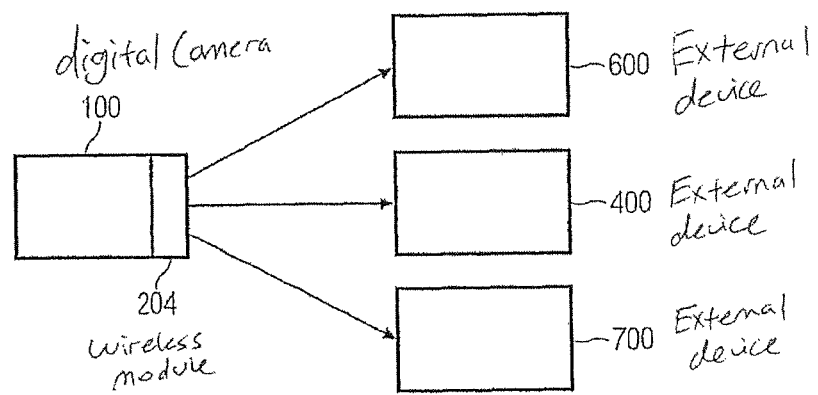
FIG. 7 is a block diagram of a wireless media wirelessly connectable in parallel to a plurality of external devices to enable data to be wirelessly received by the wireless media from, or sent by the wireless media to, the plurality of external devices.

In FIG. 7 there is shown a further exemplary embodiment where a digital camera having a wireless module 204 is able to wirelessly connect in parallel to a plurality of external devices 600, 400 and 700 to enable data to be wirelessly received by the wireless module 204 from, or sent by the wireless module 204 to, the plurality of external devices 600, 400 and 700. All of the plurality of external devices 600, 400 and 700 are wireless-enabled. One or more of the external devices 600, 400 and 700 may be a digital camera or another digital device similar to the digital camera 100. One or more of them may have a memory card 200 with a wireless transceiver module 204. The transmission is preferably substantially in real time so the data may be transmitted substantially when obtained either from the storage module 206 or from the digital camera 100. In this way the external devices 600, 400, 700 may receive the data in substantially real time and each may display and/or reproduce it and/or store it and/or resend it.

When the digital camera 100 is being used to capture data (image only, or video with or without audio), the data may be stored in the storage module 206 substantially in real time. This may be substantially at the same time as the data is being transmitted. The buffer 214 may be used to buffer the transmission or storage as required, depending on the speed and capability of the processor 202.

It is preferred that the wireless communication between the wireless transceiver module 204 of the digital camera 100 to the plurality of external devices 600, 400, 700 is based on peer-to-peer protocols and an authentication between wireless transceiver module 204 of the digital camera 100 and the plurality of external devices will take place. This may be by use of a common IP address.

Figure 8:
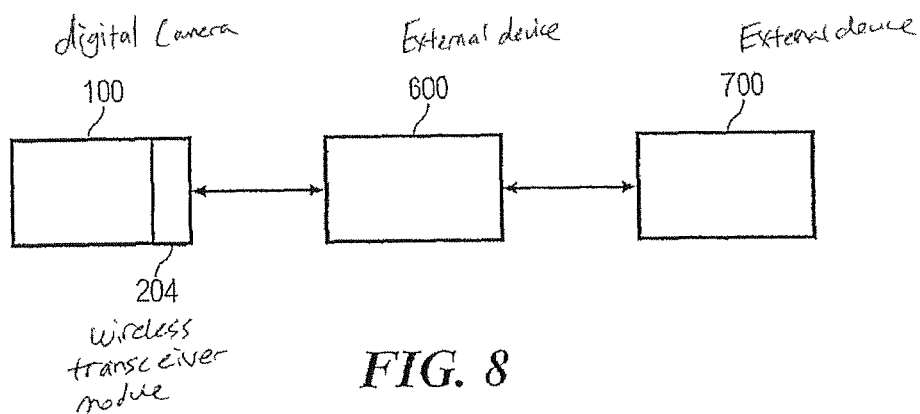
FIG. 8 is a block diagram of a wireless media wirelessly connectable in series to a plurality of external devices to enable data to be wirelessly received by the wireless media from, or sent by the wireless media to, the plurality of external devices.

FIG. 8 is a block diagram of a wireless transceiver module 204 of a memory card 200 in a digital camera 100 that is wirelessly connectable in series to a plurality of external devices 600, 700 to enable data to be wirelessly and sequentially received by the wireless transceiver module 204 from, or wirelessly and sequentially sent by the wireless transceiver module 204 to, the plurality of external devices 600, 700. All of the plurality of external devices 600, 700 are wireless-enabled. One or more of the external devices 600, 700 may be a digital camera or another digital device similar to the digital camera 100. One or more of them may have a memory card 200 with a wireless transceiver module 204. In this way the external devices 600, 700 may receive the data in substantially real time and each may display and/or reproduce it and/or store it and/or resend it.

It is preferred that the wireless communication between the wireless transceiver module 204 of the digital camera 100 to the plurality of external devices 600, 700 is based on peer-to-peer and an authentication between wireless transceiver module 204 of the digital camera 100 and the plurality of external devices will take place. This may be by use of a common IP address. The external device 600 can receive and send a stream of data substantially in real time if Wi-Fi is used. The external device 700 can receive and store a stream of data substantially in real time if Wi-Fi is used.

Figure 9A:
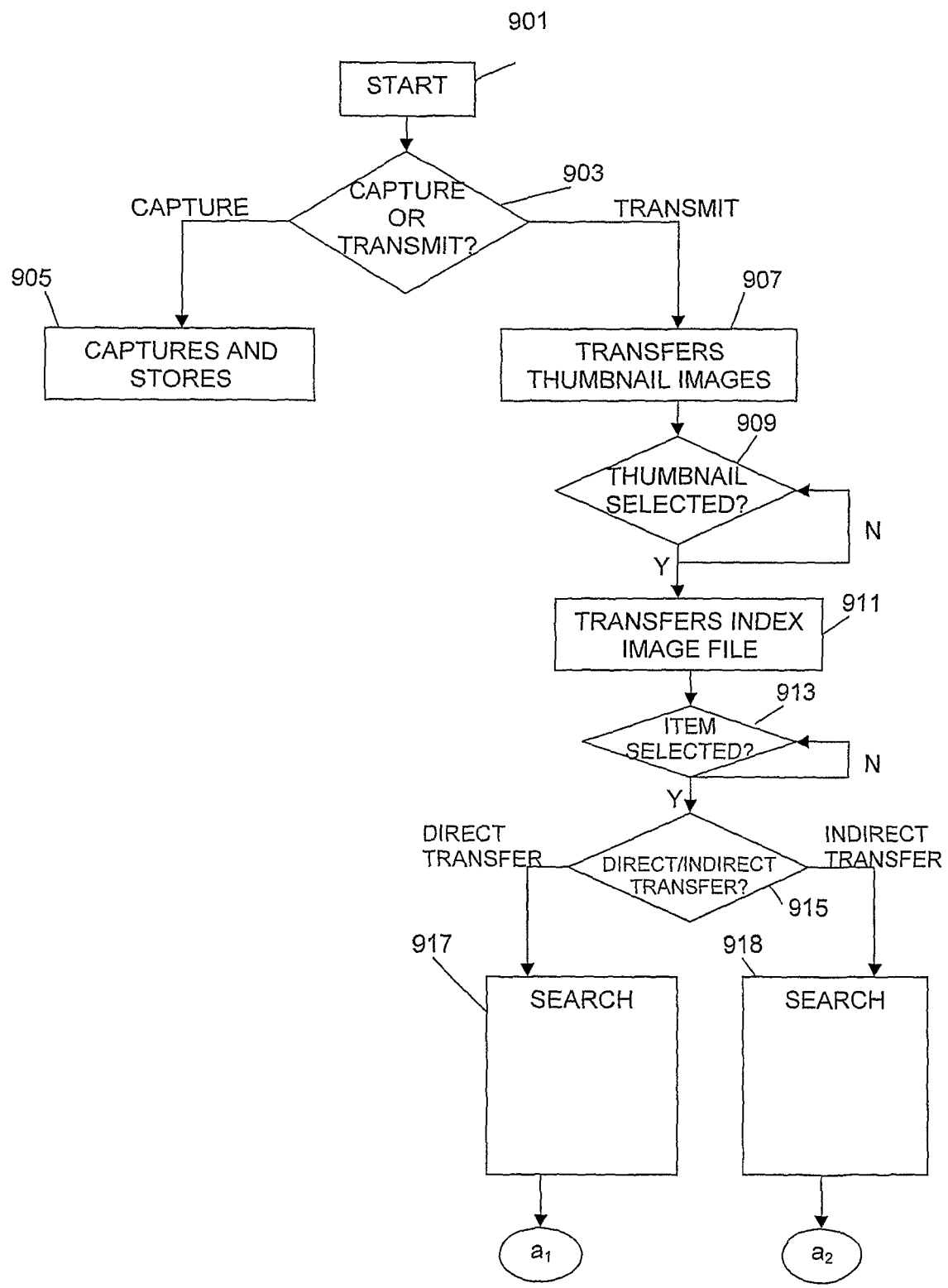
FIGS. 9a and 9b, is a flow chart for an alternative operation of the exemplary embodiment of FIGS. 1 to 4.
Figure 9B:
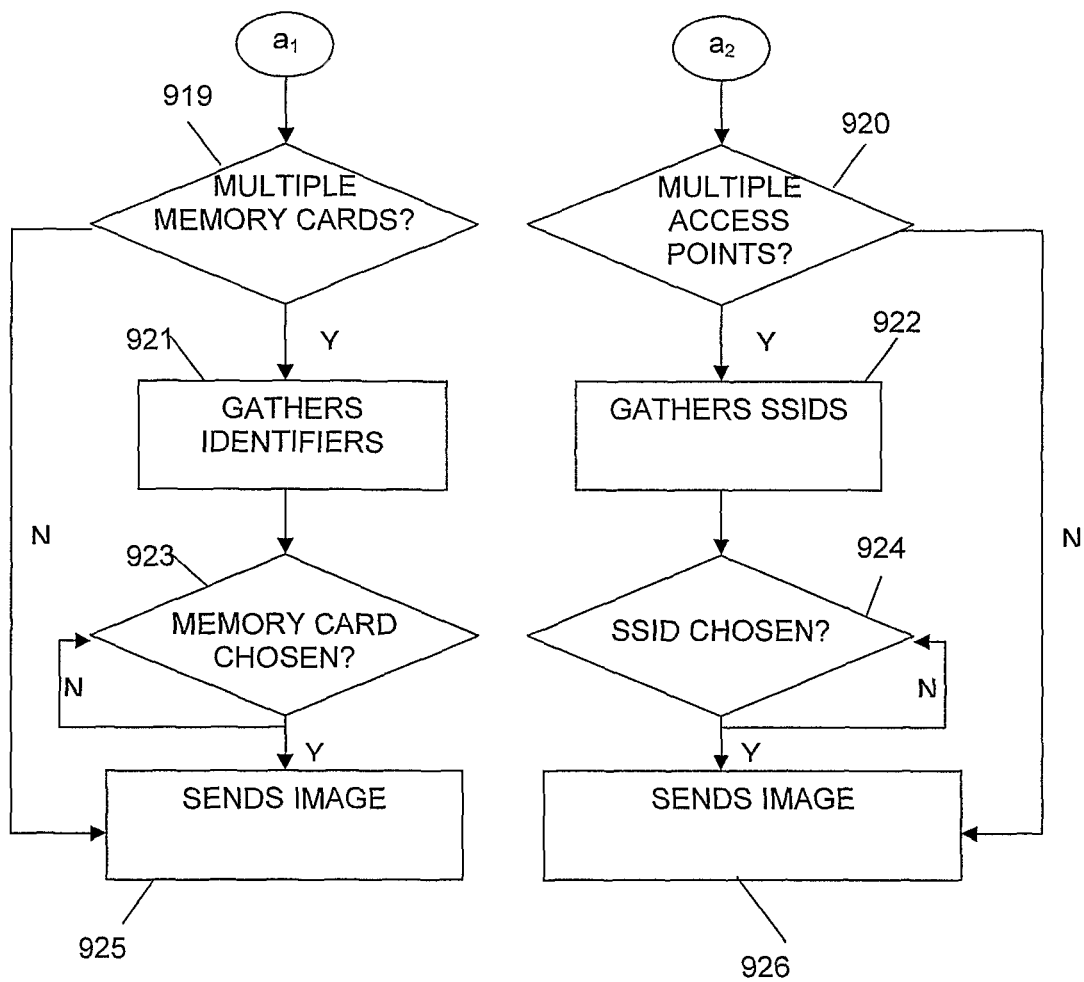

With reference to FIGS. 9*a* and 9*b*, an alternative operation of the camera 100 and the memory card 200 will now be described. Once the initial connection between the inbuilt processor 104 of the digital camera 100 and the central processor 202 of the memory card 200 is established 901, the digital camera 100 either operates in a normal, known manner under the operation of the inbuilt processor 104 or in a predetermined mode such as, for example, "view" (or its equivalent such as, for example, "play" or "display" or "transfer data") 903.

If the digital camera 100 is set to operate in the normal, known manner 905, the inbuilt processor 104 operates to capture images and instructs the central processor 202 to store images in the storage module 206 of the memory card 200.

However, if the digital camera 100 is set to operate in the predetermined mode 907, the inbuilt processor 104 downloads from the memory card 200 images for display on the display 110 in accordance with normal operations. Alternatively, the inbuilt processor 104 may also download from the card 200 thumbnail versions of the images as stored in the storage module 206 of the memory card 200 for display on the digital camera 100 in accordance with normal operations.

When one or more images or thumbnails are selected 909 via the controls 114 on the digital camera 100, the central processor 202 of the memory card 200 sends 911 to the display 110 of the digital camera 100 an index image file containing a menu, with the controls 114 on the digital camera 100 being used in the normal manner for controlling the displayed menu. The index image file comprises one or more menu items for controlling the memory card 200. Each of the one or more menu items is a separate image within the second index image file and may include, for example:

1. Direct wireless transfer
2. Indirect wireless transfer

Again, the controls 114 on the digital camera 100 are used to select 913 the desired menu item, and upon which the inbuilt processor 104 informs the central processor 202 of the selected menu item. As each menu item in the index image file has a unique image identifier, the central processor 202 of the memory card 200 again recognises 915 the selected menu item.

If menu item 1 is selected 917 by the controls 114 on the camera 100, the central processor 202 of the memory card 200 accordingly instructs the wireless transceiver module 204 to scan for nearby remote electronic apparatus with memory cards identical or similar to the memory card 200, so as to determine 919 whether or not there are more than one such remote electronic apparatus in the vicinity.

If the wireless transceiver module 204 detects only a single remote electronic apparatus, the one or more selected images are directly sent 925 to the memory card equipped in that remote electronic apparatus. If more than one remote electronic apparatus are detected, the central processor 202 gathers 921 the respective identifiers of the memory cards in the detected remote electronic apparatus. The central processor 201 subsequently sends these identifiers, through the inbuilt processor 104, to the camera 100 for display. Each of these detected identifiers is unique for recognition 923. By choosing the identifier of a particular memory card via the controls 114 on the digital camera 100, the user can thus control the memory card 200 to wirelessly transfer 925 the selected image directly to the remote electronic apparatus with the chosen memory card.

Alternatively, the central processor 202 of the memory card 200 may be configured to send the one or more selected images to the remote electronic apparatus in accordance with their relative proximity to the memory card 200. For example, the selected image(s) may be sent to the closest remote electronic apparatus. This may be done by comparing the position data wirelessly received from each respective memory card of the one or more detected electronic apparatus against the position data of the memory card 200. This may also be done by comparing the return time of electromagnetic waves that are sent from the memory card 200 (or from the digital camera 100) to the respective memory cards, as in radar systems.

By selecting 918 menu item 2 via the controls 114 on the digital camera 100, the central processor 202 of the memory card 200 can be controlled to instruct the wireless transceiver module 204 to detect 920 for availability of an access point.

If an available access point is detected, the wireless transceiver module 204 then establishes communications with that access point and sends 926 the selected image(s) to the predetermined website or server through that access point. However, if more than one available access points are detected, the central processor 202 again gathers 922 the respective identities (SSIDs) of the available access points and sends 922 these identities (SSIDs) wirelessly to the digital camera 100 for display. Again, each of these detected IDs of the available access points is unique for recognition 924. By choosing a particular access point SSID via the controls 114 on the digital camera 100, the user can thus control the memory card 200 to instruct the wireless transceiver module 204 to establish communications with that chosen access point. Once the communications between the wireless transceiver module 204 and the chosen access point have been established, the selected image(s) is wirelessly sent 926 from the memory card 200 to one or more predetermined websites or servers.

The entry of the one or more predetermined websites or servers is typically done by operatively connecting the memory card 200 to a computer, and using the computer to enter the relevant details of the website(s) or server(s).

Optionally, the central processor 202 may automatically detect for availability of an access point in the absence of a nearby remote electronic apparatus for a direct wireless transfer of a selected image from the memory card 200.

Optionally also, a buzzer (shown as '1000' in FIG. 3) may be operatively connected to the central processor 202 of the memory card 200. By sending different types of signals from the central processor 202 to the buzzer 1000 whenever data is being transferred from or to the memory card 200, different buzzer sounds emitted from the buzzer 1000 accordingly informs a user of the status of the data transfer between the digital camera 100 and the remote electronic apparatus (or between the digital camera 100 and the predetermined website/server). For example, a short beep may signal that the data transfer is in progress while a long beep may signal the end of the data transfer.

It should of course be appreciated that the user may also be informed of the status of the data transfer through the digital camera 100, for example via its display 110, its vibrator, and/or its speaker. In these instances, the central processor 202 of the memory card 200 should be configured to send appropriate signals to the inbuilt processor 104 of the camera 100 whenever data is being transferred from or to the memory card 200.

In respect of the selection of the one or more images (or thumbnail versions of the images), both the central processor 202 of the memory card 200 and the inbuilt processor 104 of the digital camera 100 may support the Digital Print Order Format (DPOF) and/or the Exchangeable Image File Format (EXIF). The DPOF format typically allows users of a digital camera to select images for direct printing, whereas the EXIF format typically allows users of a digital camera to select images for protection against deletion. However, the central processor 202 and the inbuilt processor 104 may rely on the DPOF and/or the EXIF to allow the user to select the images stored in the memory to be wirelessly sent to the remote electronic apparatus and/or the predetermined website(s) or server(s), instead of their conventional usages. This is done by configuring the central processor 202 to interpret DPOF and EXIF commands as "select" commands for sending to the desired remote electronic apparatus and/or the desired predetermined website(s) or server(s).

It should also be appreciated that the digital camera 100 may capture and store digital data in the storage module 206, and transmits that captured digital data to a remote electronic apparatus and/or a predetermined website or server, both substantially in real-time. Alternatively, the digital camera 100 may also receive and display the digital data sent by the electronic apparatus and/or the predetermined website or server, whereby the storage of that received digital data in the storage module 206 and the display of that received digital data on the digital camera 100 both take place substantially in real-time. The memory card 200 therefore supports live streaming of video data for example, in which video data are recorded and stored in the storage module 206, and wirelessly sent to a remote device, both in substantially real-time.

In a further exemplary embodiment, the inbuilt processor 104 of the digital camera 100 may set a time (e.g. five minutes) to go into "sleep" mode. As the inbuilt processor 104 may not know whether the central processor 202 of the memory card 200 is sending or receiving data, there is a risk of data transmission being disrupted if the inbuilt processor 104 goes into "sleep" mode as data is being transferred to or from the digital camera 100. To prevent this, the central processor 202 may instruct the inbuilt processor 104 to reset its time to go into "sleep" mode whenever the memory card 200 begins sending or receiving data. Alternatively, a routine polling between the central processor 202 and the inbuilt processor 104 (e.g. once every three minutes) may be established to keep the inbuilt processor 104 active so that the camera 100 does not go into "sleep" mode.

In addition, the central processor 202 of the memory card 200 may be configured to automatically set up the display 110 of the digital camera 100 at a desired starting point of an index image file in accordance with a user's preference. For example, once the initial connection between the inbuilt processor 104 and the central processor 202 is established, the camera may be automatically set to the predetermined mode such as, for example, "view".

Furthermore, the digital camera 100 may also be able to recognise the memory card 200 as a non-standard memory card when the memory card 200 is operably engaged with the digital camera 100, and the digital camera 100 is switched on. Upon recognising the memory card 200 as a non-standard memory card, the digital camera 100 accordingly activates all relevant functionalities that are within the digital camera 100. These functionalities may be any one or more, or any possible combination of, the menu functionalities controlled by the memory card 200 described above. However, the memory card 200 will still be as is shown in FIG. 3 and will continue to have the central processor 202, wireless transceiver module 204 operatively connected to the central processor 202, and the storage module 206 operatively connected to the central processor 202. The central processor 202 will continue to have the card interface 208 as well as the wireless interface 210. The wireless transceiver module 204 will continue to have the antenna 212. And the CPU 202 will continue to have the buffer 214 to enable the buffering of data particularly when the wireless transceiver module 204 is sending or receiving data. In this way the digital camera 100 may operate those menu functionalities in the normal manner of a digital camera menu and will thus not need to have each menu item as an image but will form a part of the normal operational software of the digital camera 100.

Alternatively, the one or more index image files may be stored in the digital camera 100 instead of being stored in the memory card 200. Upon recognising the memory card 200 as a non-standard memory card, the inbuilt processor 104 of the digital camera 100 may be configured to automatically set up the display 110 of the digital camera 100 at a desired starting point of a certain index file image stored in the digital camera 100—for example "view"—in accordance with a user's preference.

The memory card 200 additionally supports the digital print order format (DPOF), which is typically employed in removable media for direct (automatic) printing by a printer; direct (automatic) sending via mobile information devices such as mobile phones and personal digital assistants (PDAs); or direct (automatic) playback of still pictures on televisions and video projectors. However, the removable media must be physically removed from digital cameras and physically connected to the printer or the mobile information device for direct printing or sending respectively. Therefore, the use of such removable media employing the DPOF format is inconvenient.

By configuring the memory card 200 to support the DPOF format, the memory card 200 can be conveniently used to send the selected images to the remote electronic apparatus such as a predetermined server or website or a printer.

Figures 10A, 10B:
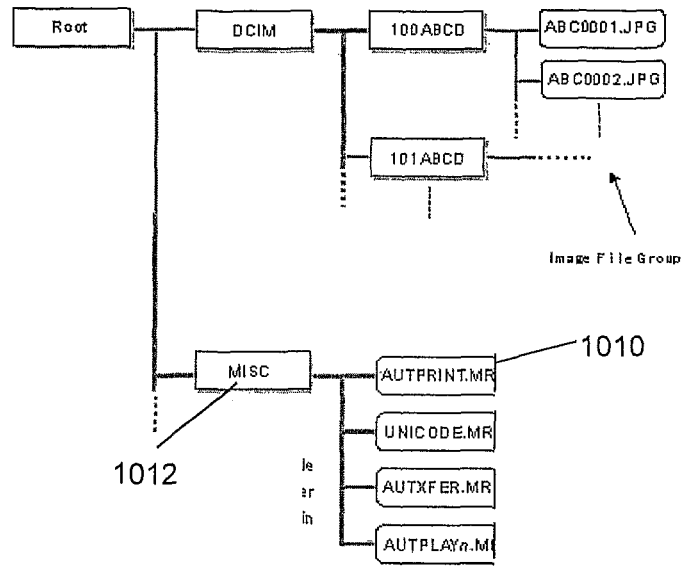

FIG. 10a illustrates a directory structure of the memory card 200 which leverages on the DPOF format to support its functionalities such as sending images wirelessly to a predetermined server/website or a printer. DPOF files such as an autoprint AUTPRINT.MRK file 1010 are stored in a miscellaneous MISC directory 1012 under a root directory of the memory card 200. FIG. 10b illustrates an example of the autoprint AUTPRINT.MRK file 1010 having a plurality of different fields such as the "PRT_QTY" 1014 and the "IMG SRC" 1016, 1018.

With regards to the PRT_QTY field 1014 in each autoprint AUTPRINT.MRK file 1010, the memory card 200 is configured to use the value of this field to trigger different types of predefined operations. For example the memory card 200 may access an action table as follows to determine these different predefined operations:

| PRT_QTY | Predefined operation |
|---------|---------------------|
| 1 | FTP upload to a predetermined server/website |
| 2 | Send files wirelessly to a printer |
| 3 | Receive files wirelessly from a remote apparatus |
| ... | ... |
| ... | ... |

Whenever the user selects the one or more images from the storage module 206 of the memory card 200 via the controls 114 on the digital camera 100, he may have the option to specifying at least one predefined operation—in accordance with the above action table—which he wishes to perform for each of the selected images. Depending on the predefined operations chosen, the autoprint AUTPRINT.MRK file 1010 is updated to include the selected image under the "IMG SRC" field.

It should of course be appreciated that the user may decide to choose more than one predefined operation for a selected image; for example he may wish to upload the selected image to the predetermined server/website as well as to send that selected image wirelessly to the printer for printing.

Figure 11:
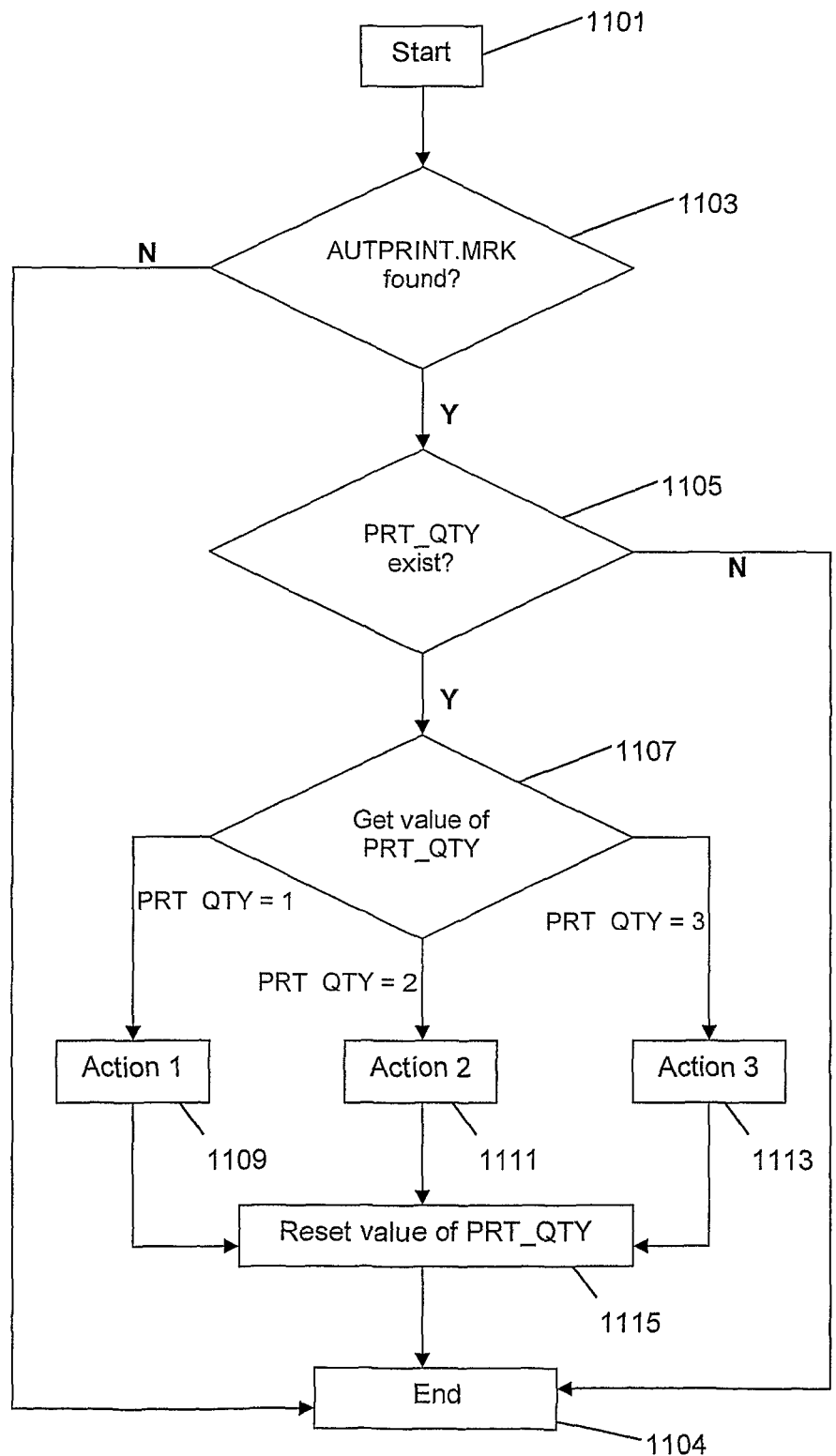
FIG. 11 shows a flow chart of the wireless media performing one of a plurality of predefined operations based on the AUTPRINT.MRK file of FIG. 10b.

FIG. 11 illustrates a flow chart in which the central processor 202 of the memory card 200 performs one of the predefined operations based on the autoprint AUTPRINT.MRK file 1010. If there is more than one autoprint AUTPRINT.MRK file 1010 stored in the memory card 200, it should be appreciated that the flow chart of FIG. 11 applies to the execution of other autoprint AUTPRINT.MRK files 1010 also.

The memory card 200 starts 1101 its operation upon being instructed by the inbuilt processor 104 of the digital camera 100. This is done through user control via the controls 114 on the digital camera 100. For example, the user may select an appropriate main menu item displayed on the digital camera 100, to instruct the central processor 202 to run the autoprint AUTPRINT.MRK file(s) 1010.

The central processor 202 then begins its search 1103 for any autoprint AUTPRINT.MRK file 1010 in the memory card 200. If none is found, the central processor 202 ends 1104 its operation and the digital camera 100 resumes its previous mode of operation. If however, an autoprint AUTPRINT.MRK file 1010 is found, the central processor 202 then scans the AUTPRINT.MRK file 1010 for the PRT_QTY field. If no PRT_QTY field is found, the central processor 202 ends 1104 its operation and the digital camera 100 then resumes its previous mode of operation. If, however, one or more PRT_QTY fields are found, the central processor 202 extracts 1107 the corresponding value(s) of the PRT_QTY field, and determines the corresponding predefined operation(s) in accordance with the action table. For PRT_QTY values of 1, 2, and 3, the central processor 202 performs 1109, 1111, 1113 the corresponding predefined operations accordingly on the appropriate images.

After the appropriate predefined operation(s) in accordance with the PRT_QTY value(s) is performed, the central processor 202 resets 1115 the PRT_QTY field(s) to a null value. This may be needed to avoid duplication of any of the predefined operation(s) that has been previously performed by the memory card 200.

The operation of the central processor 202 then ends 1104 and, once again, the digital camera 100 resumes its previous mode of operation.

Figure 12:
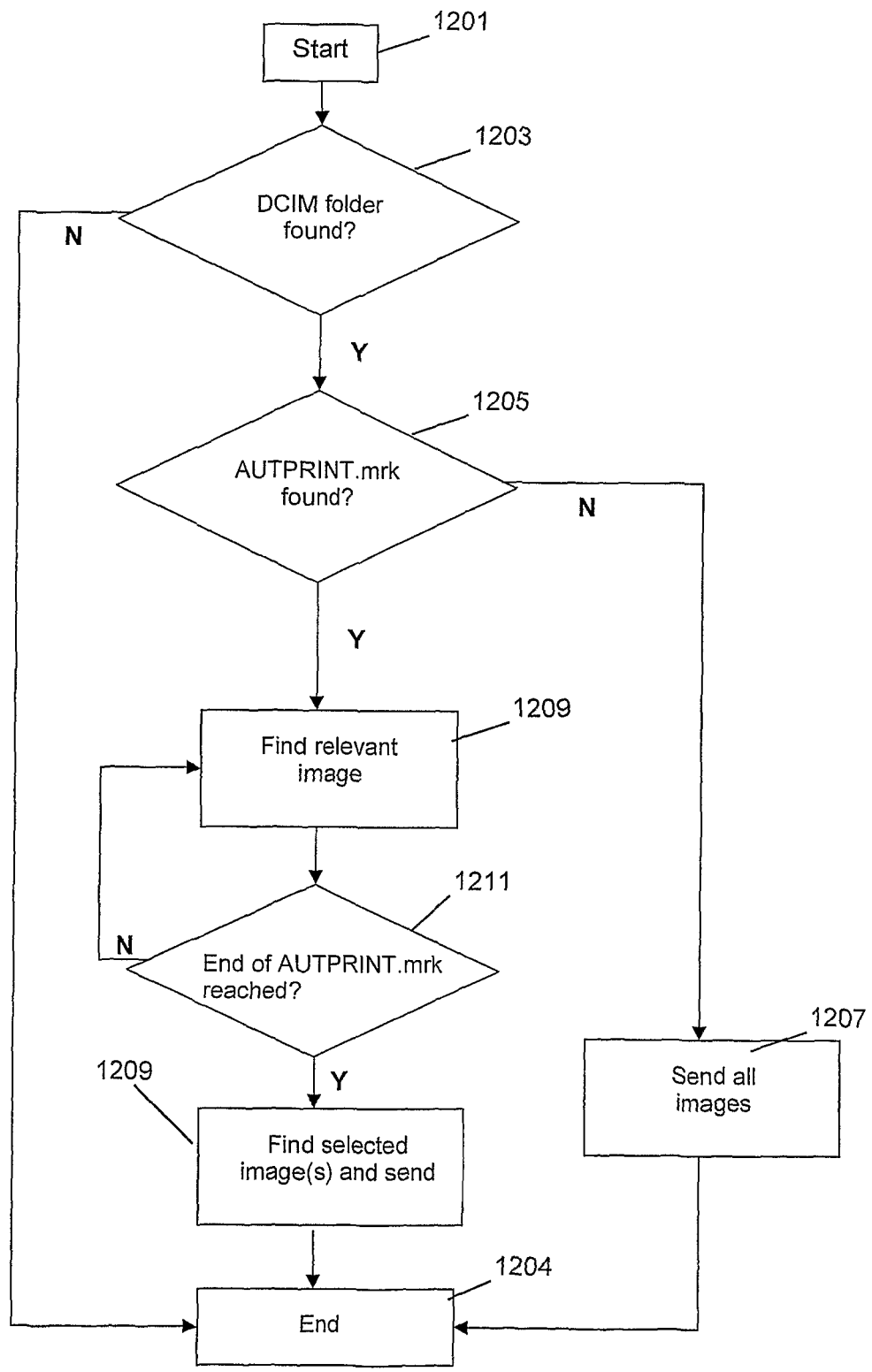
FIG. 12 shows an alternative flow chart of the wireless media sending data wirelessly from the wireless media to an external device based on the AUTPRINT.MRK file of FIG. 10b.

FIG. 12 shows an alternative flow chart in which only a single predefined operation is performed by the central processor 202 of the memory card 200.

The memory card 200 starts 1201 its operation upon being instructed by the inbuilt processor 104 of the digital camera 100. Again, this is done through user control via the controls 114 on the digital camera 100. For example, the user may select an appropriate main menu item displayed on the digital camera 100, to instruct the central processor 202 to run the autoprint AUTPRINT.MRK file(s) 1010.

The central processor 202 then begins its search 1203 for a digital camera image (DCIM) folder, in which the images are stored. If none is found, the central processor 202 ends 1204 its operation and the digital camera 100 resumes its previous mode of operation. If however, a DCIM folder is found, the central processor 202 then proceeds to search 1205 for an autoprint AUTPRINT.MRK file 101 in the memory card 200. If no AUTPRINT.MRK file 1010 is found, the central processor 202 proceeds to send all images 1207 stored in the storage module 206 to a predetermined server/website and/or a printer, upon which the central processor 202 ends 1204 the operation and the digital camera 100 resumes its previous mode of operation. If, however, an autoprint AUTPRINT.MRK file 1010 is found, the central processor 202 scans 1209 the AUTPRINT.MRK file 1010 for respective names of the selected images. The central processor 202 determines 1209 if the end of the AUTPRINT.MRK file 1010 is reached. If not, the scanning of the AUTPRINT.MRK file 1010 continues until its end is reached. The central processor then retrieves and sends 1209 the selected images from the memory card 200 to the predetermined server/website and/or the printer.

After all the selected images have been sent from the memory card 200, the central processor 202 then ends 1204 its operation and the digital camera 100 resumes its previous mode of operation.

Optionally, the selection of the images stored in the memory card 200 for wireless transmission to a remote electronic apparatus such as a personal computer or a mobile information device may be undertaken by that remote electronic apparatus. In this case, the remote electronic apparatus is capable of accessing the directory structure of the memory card 200 in order to choose one or more images from the memory card 200 for wireless transfer to itself. The remote electronic apparatus may access the directory structure of the memory card 200 via an internet browser, if the remote electronic apparatus and the memory card 200 are both connected to each other via a network such as the world-wide web.

Whilst the foregoing description has described exemplary embodiments, it will be understood by those skilled in the technology concerned that many variations in details of design, construction and/or operation may be made without departing from the present invention.

The invention claimed is:

1. A memory card configured to be used in a digital camera having an inbuilt processor incapable of independently exporting digital data externally of the digital camera or independently importing digital data from externally of the digital camera, the memory card comprising:
   a wireless transceiver being operably connected to at least one of:
   a central processor, and
   a memory storing at least one direct print order format (DPOF) file;
   and being configured to wirelessly receive the digital data transmitted to the digital camera and to wirelessly transmit the digital data from the digital camera;
   the central processor being configured to control at least one of:
   the reception of the digital data by the digital camera, and
   the transmission of the digital data from the digital camera;
   the memory being operably connected to the central processor and being configured to store at least one of the digital data captured by the digital camera, and the digital data received by the digital camera; and
   the memory card is configured to:
   use a value of a first field of the DPOF file to trigger different types of predefined operations, each predefined operations being associated with a predefined value;
   wirelessly transmit the digital data captured by the digital camera to at least one external device through the wireless transceiver when the first field of the DPOF file has a value which matches a given predefined value, wherein the digital data captured by the digital camera is stored in the memory substantially at the same time as the digital data captured by the digital camera is being transmitted via the wireless transceiver to the at least one external device, such that the at least one external device can receive the digital data captured by the digital camera substantially in real time to support live streaming; and
   wirelessly receive digital data from another external device through the wireless transceiver, wherein the storage of that received digital data in the memory and the display of that received digital data on the digital camera both take place substantially in real time to support live streaming; and
   wherein the central processor is further configured to instruct the inbuilt processor to reset the time to go into sleep mode when the memory card is transmitting or receiving digital data.

2. The memory card of claim 1, wherein the central processor is configured to be instructed by the inbuilt processor of the digital camera, to select the digital data from the memory, and to control the wireless transmission of the selected digital data to the at least one external device.

3. The memory card of claim 1, wherein the memory card is configured to detect potential wireless networks to which the memory card can be connected.

4. The memory card of claim 1, wherein the memory card is configured to detect potential wireless-enabled external devices to which the memory card can send the digital data.

5. The memory card of claim 4, wherein the memory card is configured to send the digital data to one of a plurality of detected wireless-enabled external devices, in accordance with the relative proximity between the digital camera and each of the plurality of detected wireless-enabled external devices.

6. The memory card of claim 1, wherein the memory card is configured to automatically detect for potential wireless networks in the absence of any wireless-enabled external device.

7. The memory card of claim 1, further comprising a buzzer configured to notify a user of the status of the digital data transfer from or to the digital camera.

8. The memory card of claim 1, wherein the at least one DPOF file is an autoprint AUTPRINT.MRK file.

9. The memory card of claim 8, wherein the first field is 'PRT_QTY'.

10. The memory card of claim 9, wherein at least one value of a second field in the autoprint AUTPRINT.MRK file corresponds to the file name of one of the digital data.

11. The memory card of claim 10, wherein the second field is 'IMG_SRC'.

12. The memory card of claim 1, wherein the memory is configured to be accessible by the at least one external device, the at least one external device selecting the digital data from the memory and wirelessly receiving the selected digital data from the memory card through the wireless transceiver module.

13. The memory card of claim 12, wherein the digital data stored in the memory is accessible by the at least one external device through a web browser.

14. A method for exporting digital data from and receiving digital data by a digital camera having an inbuilt processor incapable of independently exporting digital data externally of the digital camera or importing digital data from externally of the digital camera, the method comprising:
   using a memory card installed in and operatively connected to the digital camera, the memory card having a central processor, a memory and a wireless transceiver, the memory storing at least one direct print order format (DPOF) file, wherein a value of a first field of the DPOF file is used to trigger different types of predefined operations, each predefined operations being associated with a predefined value;
   using controls of the digital camera to control the operation of the memory card;
   the central processor and the memory being used to store the digital data;
   the wireless transceiver is used for:
   wirelessly receiving the digital data, wherein the storage of that received digital data in the memory and the display of that received digital data on the digital camera both take place substantially in real time to support live streaming; and
   wirelessly transmitting the digital data captured by the digital camera to the at least one external devices when the first field of the DPOF file has a value which matches a given predefined value,
   wherein the digital data captured by the digital camera is stored in the memory substantially at the same time as the digital data captured by the digital camera is being transmitted via the wireless transceiver to the at least one external device, such that the at least one external device can receive the digital data captured by the digital camera substantially in real time to support live streaming, and wherein the central processor is further configured to instruct the inbuilt processor to reset the time to go into sleep mode when the memory card is transmitting or receiving data.

15. The method of claim 14, further comprising the steps of selecting digital data from the memory and instructing the central processor to transmit the selected digital data to the least one external device.

16. The method of claim 14, further comprising the step of the memory card detecting potential wireless networks to which the memory card can be connected.

17. The method of claim 14, further comprising the step of the memory card detecting potential wireless-enabled external devices to which the memory card can send the digital data.

18. The method of claim 17, further comprising the step of the memory card sending the digital data to one of a plurality of detected wireless-enabled external devices, in accordance with the relative proximity between the digital camera and each of the plurality of detected wireless-enabled external devices.

19. The method of claim 17, wherein the wireless communication between the wireless transceiver and the plurality of detected wireless-enabled external devices is based on peer-to-peer protocols and an authentication between wireless transceiver and the plurality of external devices takes place.

20. The method of claim 19, wherein authentication is by use of a common IP address.

21. The method of claim 14, further comprising the step of the memory card wirelessly transmitting the digital data to the at least one external device, wherein the respective file name of each of the digital data corresponds to at least one value of a second field in the at least one direct print order format (DPOF) file.

22. The method of claim 14, further comprising the step of the at least one external device accessing the memory of the memory card to select the digital data and wirelessly receiving the selected digital data from the memory through the wireless transceiver.

23. A digital camera having:
an inbuilt processor incapable of independently exporting digital data externally of the digital camera or independently importing digital data from externally of the digital camera; and the memory card of claim 1.

* * * * *